3,458,420
CATAPHORETIC DEPOSITION OF NITROGEN BASIC COPOLYMERS
Herbert Spoor, Mutterstadt, Pfalz, and Heinz Pohlemann, Limburgerhof, Pfalz, Germany, assignors to Badische Anilin- & Soda-Fabrik Aktiengesellschaft, Ludwigshafen (Rhine), Germany
No Drawing. Filed Nov. 29, 1966, Ser. No. 597,525
Claims priority, application Germany, Dec. 3, 1965,
B 84,819
Int. Cl. C23b *13/00;* B01k *5/02*
U.S. Cl. 204—181  10 Claims The present invention relates to a method of producing coatings, particularly baking lacquer coatings, on electrically conducting substrates, particularly metal substrates, in which from aqueous solutions or aqueous dispersions of salts of nitrogen basic polymres the cationic polymers are electrochemically deposited on the substrates in the form of coatings by cataphoresis and then, in the case of baking lacquer coatings, baked. This method is hereinafter called cataphoresis method.

It is known that coatings, particularly baking lacquer coatings, may be prepared on electrically conducting substrates, particularly metal substrates, by electrochemically depositing the polymers on the substrates by means of anaphoresis from aqueous solutions or aqueous dispersions of salts of polymers having carboxylic acid groups, followed, in the case of baking lacquer coatings, by baking. This method will hereinafter be referred to as anaphoresis method. A peculiarity of the anaphoresis method is that not only are the polymers deposited on the substrates (the anode), but also nascent oxygen is developed at the substrates and (when the articles consist of base metals) metal ions may pass into solution. The two last-mentioned phenomena are often disadvantageous because nascent oxygen may react with the polymers in an undesirable manner and metal ions may decrease the water-proofness of the coatings and discolor them (the latter occurring particularly in the case of substrates of copper or copper alloys).

On the other hand it is a peculiarity of the cataphoresis method that although the polymers are deposited on the substrate (cathode) in this case, too, hydrogen develops at the substrates and no metal ions pass into solution even when the substrates consist of base metals. Since hydrogen in general hardly react with the polymers in an undesirable manner, the preparation of coatings by cataphoresis has, in this respect, advantages over the preparation of coatings by anaphoresis. It has however not hitherto been possible to develop salts of nitrogen basic cationic polymers from whose aqueous solutions or aqueous dispersins the polymers may not only be deposited by cataphoresis but will give coatings which have to a great extent the properties desired in coatings, such as strength of bond to the substrate, hardness, elasticity, and resistance to water and solvents.

The object of the present invention is to provide a process for applying a coating onto an electrically conducting substrate by cataphoretic deposition of a copolymer from an aqueous bath containing an ammonium salt of said copolymer, which coating has good bond strength, good hardness, good elasticity and good resistance to water and solvents, that means which has most of the properties desired in coatings.

Another object of the invention is to provide a cataphoresis method of depositing polymers from an aqueous bath which has good stability and makes it possible to coat many substrates in the same bath.

We have now found that the said object can be achieved by the use of an aqueous bath which contains in aqueous solution or aqueous dispersion an ammonium salt of a special copolymer having basic nitrogen atoms from which the copolymer is deposited.

In a process for the production of a polymer coating on an electrically conducting substrate by electrochemical deposition of a polymer having basic nitrogen atoms onto the substrate by cataphoresis from an aqueous bath containing an ammonium salt of said polymer, followed where applicable by baking the deposited coating, the improvement according to the present invention comprises depositing on said substrate a copolymer which contains in polymerized form units of:

(1) 3 to 30%, preferably 5 to 20%, by weight of at least one ethylenically unsaturated basic amino compound having not more than 20 carbon atoms, (2) 3 to 40%, preferably 5 to 30%, by weight of at least one ethylenically unsaturated compound having alcoholic hydroxy groups and 3 to 12 carbon atoms, (3) 30 to 94%, preferably 50 to 90%, by weight of at least one alkyl ester of acrylic and/or methacrylic acid having 1 to 8 carbon atoms in the alkyl radical and/or of units of styrene and/or an alkyl-substituted styrene having 1 to 4 carbon atoms in the alkyl radical and, if desired, (4i) Less than 3% by weight of at least one amide, N-alkyl amide, N-hydroxyalkyl amide, and/or N-alkoxyalkyl amide of acrylic or methacrylic acid and/or (4ii) Less than 30%, preferably less than 20% by weight of at least one other copolymerizable ethylenically unsaturated monomer.

The following should be said about the components of the copolymers to be used according to this invention.

(1) Particularly suitable ethylenically unsaturated basic amino compounds are those which contain one ethylenically unsaturated copolymerizable group and not more than 20 carbon atoms, preferably 4 to 10 carbon atoms. Representative examples of compounds of this type are:

(1i) compounds having the formula $$CH_2=CR_1-CO-A-(C_nH_{2n})-NR_2R_3$$

wherein $R_1$ is hydrogen or methyl, $R_2$ and $R_3$ are identical or different members of the class consisting of hydrogen and alkyl having 1 to 4 carbon atoms, $n$ is one of the integers 1 to 6, preferably 2 to 6, and A is oxygen or $NR_4$ wherein $R_4$ is hydrogen or alkyl having 1 to 4 carbon atoms.

Examples of suitable aminoalkyl esters of acrylic and/or methacrylic acid are the aminoalkyl esters having 1 to 6 carbon atoms in the alkyl radical, such as the aminomethyl, aminoethyl, aminopropyl, aminobutyl and aminohexyl ester. Aminoalkyl esters having 1 to 6 carbon atoms in the alkyl radical whose amino group is substituted by two identical or different alkyl groups with 1 to 4 carbon atoms, such as (N,N-di-methylamino)-ethyl ester, (N-methyl-N-butylamino)-ethyl ester and (N,N-dimethylamino)-hexyl ester are particularly suitable.

Of the N-aminoalkyl amides which have the formula $$CH_2=CR_1CO-NR_4-(C_nH_{2n}3-NR_2R_3$$

wherein $R_1$, $R_2$, $R_3$, $R_4$ and $n$ have the meanings given above, those are particularly suitable, in whose formula $R_4$ denotes a hydrogen atom, and $R_2$ and $R_3$ denote identical or different alkyl groups having 1 to 4 carbon atoms and $-(C_nH_{2n})-$ denotes a linear alkylene group with 2 to 6 carbon atoms having the two valencies at the terminal carbon atoms. Examples of suitable N-aminoalkyl amides are aminomethyl amide, 1-aminoethyl-(2) amide, 1-aminopropyl-(2) amide, N-1-(N'-butylamino)-propyl-(3) amide and 1-aminohexyl-(6) amide, and especially 1-(N',N'-dimethylamino)-ethyl-(2) amide, 1-(N',N'-dimethylamino)-propyl-(3) amide and 1-(N',N'-dimethylamino)-hexyl-(6) amide. The production of the N-aminoalkyl amides may be carried out by conventional methods, for example by reaction of lower esters or halides of acrylic acid or methacrylic acid with appropriate diamines.

(1ii) Monocyclic or bicyclic compounds having a five-membered to six-membered heterocycle containing 1 to 3, preferably 1 or 2, hetero atoms. They should have at least one basic nitrogen atom and one hetero atom which is a nitrogen atom bearing a vinyl group. The basic nitrogen atom and the nitrogen atom which bears a vinyl group may be one and the same atom. Particularly suitable monocyclic or bicyclic compounds are those which contain no hetero atoms other than nitrogen and for the rest consist of hydrocarbon radicals having not more than 20 carbon atoms. Examples of suitable monocyclic compounds are N-vinylpyrazole, N-vinylimidazole, N-vinylimidazoline, N-vinylpiperidine and analogous compounds which bear methyl, ethyl or propyl as substituents on carbon atoms in the ring. Examples of suitable bicyclic compounds are N-vinylindole and its lower C-alkyl and C-alkyl and C-alkoxy analogs.

The cataphoretic deposition, essential in the process according to this invention, of coherent coatings having good bond strength is influenced particularly favorably by N-vinylimidazoline, N-vinyl-2-alkylimidazolines having alkyl groups containing 1 to 3 carbon atoms, and N-vinylimidazole.

(2) Very suitable ethylenically unsaturated alcoholic hydroxyl compounds are those which have one ethylenically copolymerizable group and not more than 20 carbon atoms, particularly 3 to 12 carbon atoms. These compounds include for example allyl alcohol, monovinyl ethers of aliphatic diols (particularly alkane diols) having 2 to 6 carbon atoms, such as the monovinyl ethers of ethane diol and butane diol-1,4 as well as hydroxy derivatives of bicyclo-[2,2,1]-heptene-(2), such as 5-hydroxy-bicyclo-[2,2,1]-heptene-(2) and 5-hydroxy-methyl-bicyclo-[2,2,1]-heptene-(2). Monohydroxy-$C_2$-$C_6$-alkyl esters of acrylic or methacrylic acid, such as the 2-hydroxyethyl esters, 2-hydroxypropyl esters and 4-hydroxybutyl esters, are particularly suitable.

(3) Examples of suitable alkyl esters of acrylic or methacrylic acid are those having 1 to 8 carbon atoms in the alkyl radical, especially esters of alkanols having 1 to 8 carbon atoms. Examples of preferred esters are the ethyl ester, n-propyl ester, i-propyl ester, n-butyl ester, t-butyl ester and 2-ethylhexyl ester of acrylic acid and the methyl ester of methacrylic acid.

Styrene itself is particularly suitable among the styrenes, but alkyl-substituted styrenes having 1 to 4, especially 1 to 3, carbon atoms in the alkyl radical may be used instead of or together with styrene. Examples are α-alkylstyrenes, such as α-methylstyrene, and o-alkylstyrenes, m-alkylstyrenes and p-alkylstyrenes, such as o-, m- and p-vinyltoluene, and 1-vinyl-2,4-dimethylstyrene.

Other suitable ethylenically unsaturated comonomers are as follows:

(4i) In an amount of less than 3%, preferably 0.5 to 2%, by weight of an amide of acrylic or methacrylic acid.

Suitable amides having the general formula:

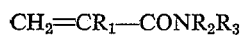

are acrylamide and methacrylamide; examples of suitable N-alkyl amides are the N-alkyl amides of acrylic and/or methacrylic acid having 1 to 4 carbon atoms in the alkyl group, such as N,N-dimethyl amide and N-butyl amide; suitable N-hydroxyalkyl amides are those with 1 to 4 carbon atoms in the hydroxyalkyl group, especially N-methylol amides; suitable N-oxaalkyl amides (which may also be named N-alkoxyalkyl amides) are particularly those having 2 to 8 carbon atoms in the oxaalkyl radical and especially N-2-oxaalkyl amides having 2 to 5 carbon atoms in the oxaalkyl radical, those being preferred which have the grouping —NH—$CH_2OR$ wherein R is an alkyl group having 1 to 4 carbon atoms. Examples are the N-2-oxapropyl amides and the N-2-oxahexyl amides of acrylic acid and methacrylic acid. The N-2-oxahexyl amides are very suitable.

(4ii) Further comonomers are preferably monoethylenically unsaturated monomers, for example vinyl esters of $C_2$ to $C_5$ alkane carboxylic acids, such as vinyl acetate, vinyl propionate or vinyl pivalate, the nitriles of acrylic or methacrylic acid as well as mono-(N,N,N-tri-($C_1$-$C_4$-alkyl)-ammonium)-($C_1$-$C_6$-alkyl) esters of acrylic or methacrylic acid having identical or different alkyl radicals on the nitrogen atom. It is preferred not to use monomers which introduce anionic groups, such as carboxylic acid, carboxylate, sulfonic acid groups and the like, into the resulting copolymer.

Usually it has proved advantageous for the copolymers to have K values of 15 to 50 (according to H. Fikentscher, Cellulosechemie, 13, 12–25, (1932)).

The production of the copolymers can be carried out by conventional methods; this is not an object of the present invention. It has proved advantageous to produce the copolymers by solution polymerization in organic solvents which may contain small amounts of water (up to about 10%). Particularly suitable solvents and solvent mixtures are those which have a solubility of at least 30 g./l. in water. Such solvents and solvent mixtures generally need not be removed or only partially removed, e.g. by distillation, from the batches in the production of aqueous solutions or dispersions. Examples of suitable solvents are methanol, ethanol, propanol, isopropanol, butanol, isobutanol, acetone, dioxane and tetrahydrofuran. Examples of suitable solvent mixtures are butanol and xylene, propanol and toluene, and dioxane and amyl acetate. Suitable methods for the production of the copolymers by solution polymerization are for example described in "Methoden der organischen Chemie," Houben-Weyl, vol. XIV/1, pages 1,044–1,047 (section γ) and pages 774–782 (section ββ).

Production of the salts of the copolymers can also be carried out by conventional methods; this is not an object of the present invention. The salts can for example be produced by contacting the copolymers with acids or acid-reacting substances. It is however also possible to contact the components of the copolymers with the acid component prior to or during copolymerization. Suitable acids or acid-reacting substances are for example hydrochloric acid, sulfuric acid, phosphoric acid, acetic acid, maleic anhydride and formic acid.

The production of the aqueous solutions or dispersions of the salts of the copolymers can be carried out by conventional methods; this is not an object of the present invention. One suitable method consists in preparing dispersions from solutions of the copolymers in organic solvents and water followed by the addition of the acid component thereto. Another suitable method consists in introducing into water the salts of the copolymers as such or in the form of their solutions in organic solvents. Usually it is particularly advantageous to so choose the working conditions that the total amount of the salts is present in the form of an aqueous solution or the greater part is present in the form of an aqueous solution and the smaller part in the form of a dispersion. Moreover, it is usually advantageous if the solutions and dispersions are adjusted to pH 1 to 8, preferably 4 to 7. This is generally the case when 0.2 to 1.5 acid equivalents of the acid component are present per base equivalent of the basic component (1). Finally, it is also advantageous to adjust the solutions and dispersions in use so that they contain a total of 3 to 20% by weight of the salts.

The aqueous solutions and dispersions of the salts of the copolymers are suitable as such for the production of coatings whose properties meet the requirements made upon them by a number of applications. For other applications, particularly the production of baking lacquer coatings, it is especially advantageous to add heat-curable aminoplast pre-condensates and/or heat-curable phenoplast pre-condensates (resols) to the solutions and dispersions. It is thus possible to lower the baking temperature and to improve the coatings' hardness, elasticity and resistance to corrosion. The said pre-condensates need not be electrodepositable by cataphoresis since they are "entrained" by the salts of the copolymers when the coatings are formed, and homogeneously incorporated in the coatings. This results in the advantage that the conventional pre-condensates used in lacquer production, particularly in the production of baking lacquers based on aqueous solutions and aqueous dispersions, can be employed in the process according to this invention. Particularly suitable pre-condensates are those which are soluble in aqueous medium, especially acid aqueous medium. However, those pre-condensates which are insoluble in aqueous medium are also suitable; pre-condensates of this type or their solutions in organic solvents can be dispersed, usually without the use of special auxiliaries, the salts of the copolymers acting as dispersing agents.

As has been previously mentioned, the conventional pre-condensates used in lacquer production are suitable. As aminoplast pre-condensates, e.g. with alkanols (having 1 to 4 carbon atoms) etherified pre-condensates of urea and formaldehyde and in particular of melamine and formaldehyde; as phenoplast pre-condensates, e.g. pre-condensates of phenol, p-tert.butyl phenol and/or 2,2-bis-(p-hydroxyphenyl)-propane and formaldehyde, those pre-condensates being preferred which are obtained by alkaline condensation. The pre-condensates contain more than one, preferably a plurality of methylol or etherified methylol groups. Hexamethoxymethylmelamine for example is very suitable. The amount of pre-condensate in the lacquer may be varied within wide limits depending on the application; however, the weight of the pre-condensates (solid) should not be greater and preferably less than that of the salts of the copolymers (solid). It is preferred to use 10 to 40, especially 20 to 30 parts by weight (solids) of the pre-condensates and 60 to 90, especially 70 to 80 parts by weight (solids) of the copolymers. In this connection it should be mentioned that aminoplast pre-condensates result in lacquers which can be baked at relatively low temperatures and which have only a slight tendency to turn yellow, whereas phenoplast pre-condensates result in lacquers which are very corrosion-resistant but which tend to turn yellow and are therefore particularly suitable for the production of primers.

The aqueous solutions or dispersions to be used according to this invention may contain small amounts of other binders in addition to the above-mentioned binders provided that these other binders are soluble or dispersible in water and can be electrodeposited in admixture with the salts of the copolymers by cataphoresis. Examples of such binders are epoxy resins and alkyd resins. The solutions or dispersions may also contain auxiliaries which can be deposited under the said conditions, such as pigments, cure catalysts and flow improvers.

The production of coatings from the aqueous solutions or dispersions on electrically conductive articles, particularly those made of metal, is carried out by cataphoretic electrodeposition followed by optional stoving. Conventional methods may be used: the articles are placed in the solutions or dispersions and made the cathode; another electrically conductive medium is also introduced into the solutions or dispersions and made the anode. Since it is usually an advantage if not ions are discharged from the anode into the solutions or dispersions used for coating, it is in general advisable to employ an anode of an appropriate material, such as carbon or a noble metal, or to separate the anode chamber from the solutions or dispersions by means of a diaphragm. Coating itself can advantageously be carried out at a D.C. voltage of 2 to 300, preferably 20 to 150; the temperature in the bath may advantageously be 10° to 50° C., preferably 20° to 40° C. The coating period is usually about 0.5 to 3 minutes. After the coatings have been applied, the articles are removed from the solutions or dispersions and may then advantageously be rinsed with water and may advantageously be kept for 5 to 180, preferably 20 to 60, minutes at a temperature of 80° to 250° C., preferably 120° to 170° C., to bake the coatings.

The method according to this invention is particularly suitable for producing baking lacquer coatings on metal articles, it being a particular advantage that not only articles of iron or iron alloys, such as car bodies and car body parts, but also articles of other metals, such as copper or copper alloys, can be provided with high-grade coatings. The process is also suitable for the production of coatings on other electrically conductive articles, such as metallized plastics and graphited textile materials.

The invention is further illustrated by the following examples in which parts and percentages are by weight.

Example 1

A 50% solution in isobutanol of a copolymer (K value 19.5) derived from 10 parts of 1-(N,N-dimethylamino)-ethyl-(2)-methacrylate (1), 15 parts of 4-hydroxybutyl acrylate (2), 25 parts of n-butyl acrylate (3i) and 50 parts of styrene (3ii) is mixed with a 60% solution in isobutanol of a melamine-formaldehydre precondensate (which is suitable for stoving finishes), the relative proportions being so chosen that the solids ratio of copolymer to pre-condensate in the mixture is 70:30. An amount of acetic acid equivalent to that of 1-(N,N-dimethylamino)-ethyl-(2)-methacrylate (1) in the copolymer is then added to the mixture. Finally the whole is diluted with water to a total solids content of 10%.

A deep-drawing steel sheet is immersed in the solutions thus obtained and made the cathode (the anode is the stainless steel vessel holding the solution); a coating is deposited thereon at a D.C. voltage of 50 in the course of 2 minutes. After being rinsed with water and baked for 20 minutes at 180° C., the coating has a thicknes of 18 microns, a pendulum hardness of 105", an Erichsen value of 4.5 and good resistance to salt water and alkaline water.

Example 2

The procedure of Example 1 is followed, but the solution of the melamine-formaldehyde pre-condensate is replaced by a 60% solution in butanol of a p-tert. butylphenol-formaldehyde pre-condensate (which is suitable for stoving finishes).

The finished coatings has a thickness of 12 microns, a pendulum hardness of 96" and an Erichsen value of 4.9.

Example 3

A 50% solution in n-butanol of a copolymer (K value 21) derived from 13 parts of 1-(N,N-dimethylamino)-propyl-(3) acrylamide (1), 10 parts of 2-hydroxyethyl acrylate (2), 45 parts of tert. butyl acrylate (3i), 30 parts of n-butyl acrylate (3ii) and 2 parts of acrylamide (4i) has added to it, 0.91 mole of acetic acid per mole of 1-(N,N-dimethylamino)-propyl-(3) acrylamide (1) in the copolymer and is mixed with a commercial water-soluble 40% solution in approximately equal parts of water and methanol of a melamine-formaldehyde pre-condensate (which is suitable for stoving finishes) which has been partially etherified with methanol, the relative proportions being so chosen that the solids ratio of copolymer to pre-condensate in the mixture is 80:20. The whole is then pigmented with titanium dioxide pigment in a mill, the relative proportion of copolymer and pre-condensate to pigment being 90:10. Finally the whole is diluted with water to a total solids content of 8%.

A deep-drawing steel sheet is immersed in the resultant solution and made the cathode (the anode is the stainless steel vessel holding the solutions); a coating is deposited thereon at a D.C. voltage of 40 in the course of one minute. After being rinsed with water and baked for 20 minutes at 170° C., the coating is hard, water-resistant and does not yellow.

We claim:

1. In a process for the production of a polymer coating on an electrically conducting substrate wherein a polymer having basic nitrogen atoms is electrochemically deposited on the substrate by cataphoresis from an aqueous bath containing an ammonium salt of said polymer, the improvement which comprises depositing on said substrate a copolymer which contains polymerized units of:
   (1) 3 to 30% by weight of at least one monoethylenically unsaturated monomer having a basic amino group and not more than 20 carbon atoms
   (2) 3 to 40% by weight of at least one monoethylenically unsaturated compound having an alcoholic hydroxy group and 3 to 12 carbon atoms
   (3) 30 to 94% by weight of at least one monomer selected from the class consisting of alkyl esters of acrylic and methacrylic acid having 1 to 8 carbon atoms in the alkyl radical, styrene and alkyl-substituted styrenes having 1 to 3 carbon atoms in the alkyl radical.

2. In a process for the production of a polymer coating on an electrically conducting substrate wherein a polymer having basic nitrogen atoms is electrochemically deposited on the substrate by cataphoresis from an aqueous bath containing an ammonium salt of said polymer, the improvement which comprises depositing on said substrate a copolymer which contains polymerized units of:
   (1) 3 to 30% by weight of at least one monoethylenically unsaturated monomer having a basic amino group and not more than 20 carbon atoms
   (2) 3 to 40% by weight of at least one monoethylenically unsaturated compound having an alcoholic hydroxy group and 3 to 12 carbon atoms
   (3) 30 to 94% by weight of at least one monomer selected from the class consisting of alkyl esters of acrylic and methacrylic acid having 1 to 8 carbon atoms in the alkyl radical, styrene and alkyl-substituted styrenes having 1 to 3 carbon atoms in the alkyl radical
   (4i) less than 3% by weight of at least one amide of acrylic and methacrylic acid having the general formula $$CH_2=CR_1-CO-NR_2R_3$$

wherein $R_1$ is a member of the class consisting of hydrogen and methyl and $R_2$ and $R_3$ are members selected from the group consisting of hydrogen, alkyl having 1 to 8 carbon atoms, hydroxyalkyl having 1 to 4 carbon atoms and oxaalkyl having 2 to 8 carbon atoms
   (4ii) 0 to 30% by weight of at least one other copolymerizable ethylenically unsaturated monomer.

3. A process as claimed in claim 1 wherein the monomeric component (1) has the formula

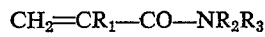
$$CH_2=CR_1-CO-A-(C_nH_{2n})-NR_2R_3$$

wherein $R_1$ is a member selected from the class consisting of hydrogen and methyl, $R_2$ and $R_3$ are members of the class consisting of hydrogen and alkyl having 1 to 4 carbon atoms, $n$ is one of the integers 1 to 6, and A is —O— or $NR_4$ wherein $R_4$ is a member selected from the class consisting of hydrogen and alkyl having 1 to 4 carbon atoms.

4. A process as claimed in claim 1 wherein the monomeric component (1) is a compound selected from the class consisting of a monocyclic and a bicyclic five-membered to six-membered heterocycle which contains 1 to 3 hetero atoms of which at least one is a basic nitrogen atom and one is a nitrogen atom bearing a vinyl group.

5. A process as claimed in claim 1 wherein the monomeric component (2) is a hydroxyalkyl ester of acrylic or methacrylic acid having 2 to 6 carbon atoms in the alkyl group.

6. A process as claimed in claim 1 wherein the aqueous bath contains, in an amount less than the amount of the ammonium salt of said copolymer, a heat-curable condensate selected from the class consisting of aminoplast condensates and phenolplast condensates having more than one methylol or alkanol-etherified methylol group and being soluble or dispersable in water.

7. A process as claimed in claim 3 wherein the monomeric component (1) is 1-(N,N-dimethylamino)-ethyl-(2)-methacrylate.

8. An electrically conducting article having an improved polymer coating obtained by the cataphoretic deposition from an aqueous bath containing an ammonium salt of a copolymer containing polymerized units of:
   (1) 3 to 30% by weight of at least one monoethylenically unsaturated monomer having a basic amino group and not more than 20 carbon atoms
   (2) 3 to 40% by weight of at least one monoethylenically unsaturated compound having an alcoholic hydroxy group and 3 to 12 carbon atoms
   (3) 30 to 94% by weight of at least one monomer selected from the class consisting of alkyl esters of acrylic and methacrylic acid having 1 to 8 carbon atoms in the alkyl radical, styrene and alkyl-substituted styrenes having 1 to 3 carbon atoms in the alkyl radical.

9. An electrically conducting article having an improved polymer coating obtained by the cataphoretic deposition from an aqueous bath containing an ammonium salt of a copolymer containing polymerized units of:
   (1) 3 to 30% by weight of at least one monoethylenically unsaturated monomer having a basic amino group and not more than 20 carbon atoms
   (2) 3 to 40% by weight of at least one monoethylenically unsaturated compound having an alcoholic hydroxy group and 3 to 12 carbon atoms
   (3) 30 to 40% by weight of at least one monomer selected from the class consisting of alkyl esters of acrylic and methacrylic acid having 1 to 8 carbon atoms in the alkyl radical, styrene and alkyl-substituted styrenes having 1 to 3 carbon atoms in the alkyl radical
   (4i) less than 3% by weight of at least one amide of acrylic and methacrylic acid having the general formula

   $$CH_2=CR_1-CO-NR_2R_3$$

wherein $R_1$ is a member of the class consisting of hydrogen and methyl and $R_2$ and $R_3$ are members selected from the group consisting of hydrogen, alkyl having 1 to 8 carbon atoms, hydroxyalkyl having 1 to 4 carbon atoms and oxaalkyl having 2 to 8 carbon atoms
   (4ii) 0 to 30% by weight of at least one other copolymerizable ethylenically unsaturated monomer.

10. An electrically conducting article having an improved polymer coating obtained by the cataphoretic deposition from an aqueous bath containing an ammonium salt of a copolymer containing polymerized units of:
    (1) 3 to 30% by weight of at least one monoethylenically unsaturated monomer having a basic amino group and not more than 20 carbon atoms
    (2) 3 to 40% by weight of at least one monoethylenically unsaturated compound having an alcoholic hydroxy group and 3 to 12 carbon atoms
    (3) 30 to 94% by weight of at least one monomer selected from the class consisting of alkyl esters of acrylic and methacrylic acid having 1 to 8 carbon atoms in the alkyl radical, styrene and alkyl-substituted styrenes having 1 to 3 carbon atoms in the alkyl radical and in an amount less than the amount of the ammonium salt of said copolymer of a heat-curable condensate selected from the class consisting of aminoplast condensates and phenoplast condensates having more than one methylol or alkanol-etherified methylol group and being soluble or dispersable in water.

References Cited

UNITED STATES PATENTS

| | | | |
|---|---|---|---|
| 2,206,090 | 7/1940 | Haggenmacher | 204—181 |
| 2,345,543 | 3/1944 | Wohnsiedler et al. | 204—181 |
| 3,033,811 | 5/1962 | Brown et al. | |
| 3,178,397 | 4/1965 | Olaj et al. | |
| 3,230,162 | 1/1966 | Gilchrist | 204—181 |
| 3,227,672 | 1/1966 | Fertig et al. | |
| 3,262,912 | 7/1966 | Maeder | 260—80.73 |
| 3,308,081 | 3/1967 | Glabisch. | |
| 3,341,505 | 9/1967 | Gander. | |
| 3,347,836 | 10/1967 | Nagata | 260—80.73 |
| 3,385,839 | 5/1968 | Homg et al. | 260—80.73 |
| 3,399,159 | 8/1968 | Samour. | |

FOREIGN PATENTS

| | | |
|---|---|---|
| 684,839 | 4/1964 | Canada. |

JOHN H. MACK, Primary Examiner

E. ZAGARELLA, Jr., Assistant Examiner

UNITED STATES PATENT OFFICE
CERTIFICATE OF CORRECTION

Patent No. 3,458,420

July 29, 1969

Herbert Spoor et al.

It is certified that error appears in the above identified patent and that said Letters Patent are hereby corrected as shown below:

Column 1, line 17, "polymres" should read -- polymers --; line 46, "react" should read -- reacts --. Column 2, line 59, "$(C_nH_{2n}3$" should read -- $(C_nH_{2n})$ --. Column 5, line 65, "not" should read -- no --. Column 6, line 39, "nes" should read -- ness --. Column 8, line 9, "phenolplast" should read -- phenoplast --.

Signed and sealed this 28th day of April 1970.

(SEAL)
Attest:

Edward M. Fletcher, Jr.
Attesting Officer

WILLIAM E. SCHUYLER, JR.
Commissioner of Patents